United States Patent [19]

Malone

[11] Patent Number: 5,206,082

[45] Date of Patent: Apr. 27, 1993

[54] NONDISTORTED POLYETHYLENE FOAM STRUCTURES AND PROCESS FOR MAKING

[75] Inventor: Bruce A. Malone, Granville, Ohio

[73] Assignee: The Dow Chemical Company, Midland, Mich.

[21] Appl. No.: 892,411

[22] Filed: Jun. 1, 1992

Related U.S. Application Data

[63] Continuation of Ser. No. 674,007, Mar. 25, 1991, abandoned.

[51] Int. Cl.$^5$ .............................. B32B 3/26; B32B 7/00
[52] U.S. Cl. ..................................... 428/294; 264/46.1; 428/314.8; 428/316.6; 428/398; 521/79
[58] Field of Search ..................... 264/46.1; 428/314.8, 428/316.6, 398; 521/79

[56] References Cited

U.S. PATENT DOCUMENTS 4,801,484  1/1989  Yao et al. .............................. 428/294
4,894,395  1/1990  Park ....................................... 521/79

*Primary Examiner*—William J. Van Balen
*Attorney, Agent, or Firm*—J. Robert Dean, Jr.

[57] ABSTRACT

Disclosed is a closed-cell, non-crosslinked foam structure of a ratio of minor dimension to major dimension of about 1/8 or less comprising a plurality of coalesced extruded strands or profiles of a foamed polyolefin composition having an average cell size of from 0.02 to 0.5 millimeters. The cross-sectional geometry of the foam structure substantially corresponds to the overall arrangement of the orifices of the die from which the foamed polyolefin composition was extruded. Further disclosed is a process for making the above foam structure comprising extruding a foamable polyolefin composition through the multiorifice die to form the structure.

15 Claims, No Drawings

NONDISTORTED POLYETHYLENE FOAM STRUCTURES AND PROCESS FOR MAKING

CROSS-REFERENCE TO RELATED APPLICATIONS

This is a continuation of application Ser. No. 07/674,007, filed Mar. 25, 1991 is now abandoned.

BACKGROUND OF THE INVENTION

The invention relates to a closed-cell, non-crosslinked polyethylene foam structure of relatively small cell size and relatively low cross-section minor to major dimension ratio. The extruded structure is substantially free of distortion, convolution, or corrugation from its intended shape or geometry.

Solid closed-cell polyethylene foam structures of relatively low cross-section minor to major dimension ratio, height to width in the case of those of rectangular cross-section, have found numerous commercial applications such as cushioning, packaging, insulation, sheeting, and the like. To enhance insulative performance, softness, sound absorption, and nonabrasiveness of such structures, it would be desirable to reduce the cell size of the polyethylene foam comprising the structure.

A problem with making solid closed-cell, non-crosslinked polyethylene foam structures of relatively small cell sizes (e.g. 0.02 to 0.5 mm) and relatively low cross-section dimension ratios (e.g. ⅛ or less) is that the structure actually formed may be in a geometry or shape other than that intended. As the foamable composition from which the structure is made exits the die, it is not able to expand directionally outward with respect to the major dimension of the die orifice at a rate sufficient to prevent the structure from becoming distorted, convoluted, or corrugated along its major dimension. The structure cannot expand rapidly enough because relatively small cell size foams have relatively high foaming rates, which result from the relatively high levels of nucleator required to make foams having relatively small cell size.

It would be desirable to have a closed-cell, non-crosslinked polyethylene foam structure of relatively low cross-section minor to major dimension ratio comprised of a polyethylene foam of relatively small cell size. Such foam structure would be substantially free of deviation or distortion from its intended shape or geometry.

SUMMARY OF THE INVENTION

According to the present invention, there is a closed-cell, non-crosslinked foam structure of a ratio of minor dimension to major dimension of about ⅛ or less in cross-section comprised of coalesced strands or profiles of a foamed polyethylene composition having an average cell size of from 0.02 to 0.5 millimeters. The foam structure substantially corresponds in cross-sectional geometry to the geometry of the overall arrangement of the orifices of the die from which it was extruded. The extrusion of the foam structure in the form of coalesced strands or profiles allows structures of such relative cross-sectional dimension ratios (e.g. height to width for rectangular structures) in such cell size range to be formed without distortion, convolution, or corrugation from the intended or desired shape or geometry. Distortion, convolution, or corrugation from the intended or desired shape or geometry is substantially avoided because the strands or profiles expand into the channels between themselves instead of foam expanding against itself as in a solid foam.

According to the present invention, there is a process for making a closed-cell, non-crosslinked foam structure of a ratio of minor dimension to major dimension in cross-section of about ⅛ or less and comprised of a foamed polyethylene composition having an average cell size of from 0.02 to 0.5 millimeters. The process comprises coextruding a foamable polyethylene composition through a die defining a plurality of orifices therein to form a plurality of coalesced extruded strands or profiles of the foamed polyethylene composition forming the above foam structure substantially corresponding to the geometry of the overall arrangement of the orifices of the die.

DETAILED DESCRIPTION

The present foam structure is formed of coalesced closed-cell, non-crosslinked polyethylene foam strands or profiles having an average cell size of from 0.02 to 0.5 millimeters and minor to major dimension ratios of less than about ⅛ or less to be made substantially corresponding to the shape or geometry of the overall arrangement of the orifices of the die from which the structure was extruded. The present foam structure circumvents the problems associated with prior art foam structures of that cell size range and relative dimension by its ability to accommodate the high rate of foaming without being distorted, convoluted, or corrugated.

The present foam structure is formed by extrusion of a molten foamable, non-crosslinked polyethylene composition through a multiorifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles of polyethylene foam should remain adhered into unitary structure to prevent strand delamination under stresses encountered in preparing, shaping, and using the foam. Apparatuses and methods for producing foam structures of strand form are seen in U.S. Pat. Nos. 3,573,152 and 4,824,720, both of which are incorporated herein by reference.

The strands or profiles will vary in cross-sectional shape or geometry according to the shape or geometry of the orifices in the die. The strands or profiles may be the same or different shape or geometry than the foam structure which they coalesce to form. The orifices may take on a circular shape or a noncircular shape though circular is preferred. Suitable noncircular shapes include X-shaped, cross- or star-shaped, or polygonal-shaped. The various orifices in the die may be specially arranged in a desired configuration or array such as a sine wave, honeycomb, square saw tooth, or a triangular saw tooth wave pattern. Preferably, the individual strands, have a major dimension in cross-section, diameter in the case of circular strands, of between about 0.5 and about 10 millimeters and most preferably between about 1.0 and about 5.0 millimeters.

The orifices in the die will be of shape or geometry and be spacially arranged such that there will be sufficient channel volume or clearance between the streams of molten extrudate exiting from the same for them to foam to form the strands or profiles without substantial distortion, convolution, or corrugation of the resulting unitary foam structure relative to the geometry of the overall arrangement of the orifices. The streams of molten extrudate may foam to either partly or completely fill the open channel volume between the strands or profiles.

The geometry or shape of the resulting foam structure will substantially correspond to the overall arrangement or geometry of the die orifices or, in other words, to the intended or desired shape or geometry. For instance, a plurality or multiplicity of circular orifices arranged in a rectangular pattern will yield a rectangular foam structure. A plurality or multiplicity of circular orifices arranged in a circular pattern will yield a cylindrical or circular foam structure. The geometry or shape of the present foam structure will correspond to the overall arrangement or geometry of the orifices in the die from which it is extruded without substantial distortion, convolution, or corrugation therefrom.

The foam structure typically will have cross-sectional dimensions larger than the dimensions defined by the overall arrangement or geometry the die orifices of the die from which it was extruded due to foaming of the molten extrudate, but the relative cross-sectional dimensions of the foam structure will substantially correspond to the relative dimensions of the overall arrangement or geometry of the die orifices. For instance, in the case of a rectangular arrangement of circular die orifices, the resulting foam structure will have rectangular cross-sectional dimensions exceeding that of the overall arrangement or geometry of the die orifices, but will have substantially the same relative cross-sectional dimensions.

Blending of various components in the method of the present invention in order to provide suitable foamable polyethylene compositions accomplished according to known techniques in the art. Suitably, a mixer, extruder, or other suitable blending device is employed to obtain a homogeneous melt. The extruder or other suitable blending device is also employed to incorporate a blowing agent. Nucleating agents, extrusion aids, antioxidants, colorants, pigments, etc. may also be incorporated a desired.

Suitable foamable compositions include polyethylene. Preferred are copolymers of ethylene and a monoethylenically unsaturated polar monomer copolymerizable therewith, especially carboxyl-containing comonomers. Examples include copolymers of ethylene and acrylic acid or methacrylic acid and $C_{1-4}$ alkyl ester or ionomeric derivatives thereof; ethylene vinyl-acetate copolymers; ethylene/carbon monoxide copolymers; anhydride containing olefin copolymers of a diene and a polymerizable; copolymers of ethylene and an α-olefin having low molecular weight (i.e., densities less than 0.92); blends of all of the foregoing resins; blends thereof with polyethylene (high, intermediate or low density) etc. Particularly preferred compositions are copolymers of ethylene and acrylic acid, (EAA copolymers) having up to about 30 percent by weight of copolymerized acrylic acid; ionomeric derivatives of the foregoing, copolymers of ethylene and vinyl acetate ultra low density polyethylene: and blends of the foregoing with one another and with low density polyethylene.

The polymers of ethylene and a polar comonomer may be prepared by known addition polymerization techniques, or by a grafting reaction of the reactive comonomer with a preformed polymer of ethylene. Additional elastomeric components such as polyisobutylene, polybutadiene, ethylene/propylene copolymers, and ethylene/propylene/diene interpolymers may be included in the blend if desired.

A most preferred resin composition comprises a copolymer of ethylene and acrylic acid or ethylene and vinyl acetate containing from about 85 percent to about 98 percent ethylene. A most preferred composition comprises a homogeneous, random copolymer of ethylene and acrylic acid. Copolymers of ethylene and acrylic acid or of ethylene and vinyl acetate may be obtained from The Dow Chemical Company. Ethylene vinyl acetate copolymer may also be obtained under the tradename Elvax from E. I. DuPont deNemours & Company. Anhydride modified copolymers of ethylene are available under the tradename Plexar from Norchem, Inc. Ionomeric copolymers are available under the tradename Surlyn from E. I. duPont deNemours & Company.

The present foam structure is extruded with one or more of any blowing agents known in the art. Suitable blowing agents include halocarbons such as fluorocarbons and chlorofluorocarbons; hydrohalocarbons such as hydrofluorocarbons and hydrochlorofluorocarbons; alkylhalides such as methyl chloride and ethyl chloride; hydrocarbons such as the alkanes or alkenes of 2 to 9 carbon atoms; common gases such as air, carbon dioxide, nitrogen, argon; water; or mixtures of any of the above.

Preferred blowing agents are alkanes such as butane, isobutane, pentane, isopentane, hexane, isohexane, heptane, and the like. A most preferred blowing agent is isobutane. Hydrocarbons such as alkanes are preferred due to their relatively low ozone depletion potential. Suitable blowing agents also include chemical blowing agents such as ammonium and azo type compounds. Such compounds include ammonium carbonate, ammonium bicarbonate, potassium bicarbonate, diazoaminobenzene, diazoaminotoluene, azodicarbonamide, diazoisobutyronitrile, and the like.

The term non-crosslinked foam structure means that the foam composition comprising the strands from which the foam structure is formed is substantially free of crosslinking. The term non-crosslinked is inclusive however, of the slight degree of crosslinking which may occur naturally without the use of crosslinking agents.

Suitable foam structures have gross densities (that is bulk densities or densities of the closed-cell foam including interstitial channels or voids between strands or profiles), preferably varying from about 3.2 to about 48 kilograms per cubic meter ($kg/m^3$). Most preferred foam structures have a density from about 8.0 to about 45 $kg/m^3$. For specific uses in low weight cushioning applications a preferable alternate embodiment comprises portions having densities less than 32 $kg/m^3$. The individual strands of foam comprising the foam structure preferably possess a local or strand density from about about 8.0 to about 96 $kg/m^3$, and most preferably from about 16 to about 48 $kg/m^3$.

The present foam structure is comprised of foam strands having an average cell size of between 0.02 to 0.5 millimeters. A particularly preferred foam structure is comprised of foam strands having an average cell size of between about 0.1 and about 0.3 millimeters.

In the present closed-cell foam structure, preferably at least about 70 percent of the total number of cells in the foam are closed-cell as opposed to open-cell not including interstitial channels or voids between the foam strands comprising the foam structure.

To further illustrate the present invention, a nonlimiting example of same is provided below.

EXAMPLE

A polyethylene foam structure of the present invention was formed by extruding a composition of polyethylene/ Surlyn ® 8660 ionomer in a 90/10 weight ratio, 26 parts per hundred CFC-114/CFC-12 in a 80/20 weight ratio, and 0.8 parts per hundred at a rate of 136 kg./hr. through a multiorifice die containing 1500 circular orifices arranged in a rectangular configuration. The resulting structure had a cross-sectional dimension of 3.8 centimeters by 62.2 centimeters and an average cell size of 0.3 millimeters. The structure was substantially free of distortion, convolution, or corrugation from its intended rectangular shape.

While embodiments of the method and the foam of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A closed-cell, non-crosslinked foam structure comprising a plurality of coalesced extruded strands or profiles of a foamed polyolefin composition, the foamed polyolefin composition having an average cell size of from 0.02 to 0.5 millimeters, the foam structure having a ratio of minor dimension to major dimension in cross-section of about ⅛ or less, the cross-sectional geometry of the foam structure substantially corresponding to the geometry of the overall arrangement of the orifices of the die from which it was extruded.

2. The foam structure of claim 1, wherein the cross-sectional geometry of the foam structure is generally rectangular.

3. The foam structure of claim 1, wherein the polyolefin comprises a polyethylene or a copolymer thereof.

4. The foam structure of claim 1, wherein the polyolefin comprises polypropylene or a copolymer thereof.

5. The foam structure of claim 1, wherein the foamed polyolefin composition has an average cell size of between about 0.1 and about 0.3 millimeters.

6. A closed-cell, non-crosslinked foam structure comprising a plurality of coalesced extruded strands or profiles of a foamed polyolefin composition, the foamed polyolefin composition having an average cell size of from 0.02 to 0.5 millimeters, the foam structure having a ratio of minor dimension to major dimension in cross-section of about ⅛ or less, the cross-sectional geometry of the foam structure substantially corresponding to the desired cross-sectional geometry.

7. The foam structure of claim 6, wherein the cross-sectional geometry of the foam structure is generally rectangular.

8. The foam structure of claim 7, wherein the polyolefin comprises a polyethylene or a copolymer thereof.

9. The foam structure of claim 8, wherein the polyolefin comprises polypropylene or a copolymer thereof.

10. The foam structure of claim 9, wherein the foamed polyolefin composition has an average cell size of between about 0.1 and about 0.3 millimeters.

11. A process for making a closed-cell, non-crosslinked, substantially non-distorted extruded foam structure of a ratio of minor dimension to major dimension in cross-section of about ⅛ or less and comprised of a foamed polyolefin composition having an average cell size of from 0.02 to 0.5 millimeters, comprising: coextruding a foamable polyolefin composition capable of forming a foamed polyolefin composition having an average cell size of from 0.02 to 0.5 millimeters through a die defining a plurality of orifices therein having an overall arrangement of minor to major dimension of about ⅛ or less to form a plurality of coalesced extruded strands or profiles of the foamed polyolefin composition forming the foam structure.

12. The process of claim 11, wherein the foam structure is generally rectangular.

13. The process of claim 11, wherein the polyolefin comprises polyethylene or a copolymer thereof.

14. The process of claim 11, wherein the polyolefin comprises polypropylene or a copolymer thereof.

15. The process of claim 11, wherein the foamed polyolefin composition has an average cell size of between about 0.1 and about 0.3 millimeters.

* * * * *

UNITED STATES PATENT AND TRADEMARK OFFICE
CERTIFICATE OF CORRECTION

PATENT NO. : 5,206,082
DATED : April 27, 1993
INVENTOR(S) : Bruce A. Malone

It is certified that error appears in the above-indentified patent and that said Letters Patent is hereby corrected as shown below:

Title page, item [57], Abstract, lines 4, 9, and 11, delete "polyolefin",
and insert --polyethylene--.
Column 5, claim 1, lines 3 and 4, delete each instance of "polyolefin", and
insert --polyethylene--.
Column 5-6, delete claims 3, 4, 8, 9, 13, and 14--.
Column 6, claim 5, line 2, delete "polyolefin", and insert --polyethylene--.
Column 6, claim 6, lines 3 and 4, delete each instance of "polyolefin",
and insert --polyethylene--.
Column 6, claim 10, line 1, delete "9", and insert --6--.
Column 6, claim 10, line 2, delete "polyolefin", and insert --polyethylene--.
Column 6, calim 11, lines 5, 7, 8, and 13, delete each instance of
"polyolefin", and insert --polyethylene--.

Signed and Sealed this

Twenty-sixth Day of April, 1994

Attest:

BRUCE LEHMAN

Attesting Officer    Commissioner of Patents and Trademarks